United States Patent
Farmer, III et al.

[15] 3,675,716
[45] July 11, 1972

[54] HEAT-STABLE CALCIUM-COMPATIBLE WATERFLOOD SURFACTANT

[72] Inventors: Robert F. Farmer, III; Jimmie B. Lawson, both of Houston, Tex.

[73] Assignee: Shell Oil Company, New York, N.Y.

[22] Filed: March 9, 1970

[21] Appl. No.: 17,898

[52] U.S. Cl. .......................................... 166/275, 252/8.55 D
[51] Int. Cl. ............................................................. E21b 43/22
[58] Field of Search ................................. 166/263, 273–275, 166/305 R; 252/8.55 D; 260/458, 459

[56] References Cited

UNITED STATES PATENTS

| | | |
|---|---|---|
| 2,965,678 | 12/1960 | Sundberg et al. .............. 252/8.55 D X |
| 3,338,949 | 8/1967 | Hagemeyer et al. ..................... 260/459 |
| 3,413,331 | 11/1968 | Beiser et al. ............................ 260/458 |
| 3,500,923 | 3/1970 | Reisberg ............................ 166/275 X |
| 3,508,612 | 4/1970 | Reisberg et al. .................... 166/275 X |

*Primary Examiner*—Ian A. Calvert
*Attorney*—Harold W. Coryell and J. H. McCarthy

[57] ABSTRACT

A waterflood oil recovery process, in which a surfactant system (comprising an aqueous, oil or two-phase liquid solution or dispersion of a mixture of petroleum sulfonate and alkoxylated alcohol sulfate surfactants) is injected into a reservoir to displace oil, is improved by using a sulfate surfactant that contains at least one chain-branching substituent on a carbon atom alpha or beta to the sulfate group. In a reservoir that is relatively hot, the improved process provides good oil-displacement efficiency and polyvalent metal ion compatibility in addition to improved stability towards hydrolytic decomposition of the sulfate surfactant.

5 Claims, No Drawings

HEAT-STABLE CALCIUM-COMPATIBLE WATERFLOOD SURFACTANT

RELATED PATENT APPLICATION

The present patent application is related to a copending and commonly assigned patent application by J. B. Lawson, J. Reisberg, and G. Smith, Ser. No. 752,882 filed Aug. 15, 1968 (now U. S. Pat. No. 3,508,612). The copending patent application describes a waterflood process for recovering oil by injecting an aqueous drive fluid into a reservoir behind an active surfactant system that contains a mixture of petroleum sulfonate and alkoxylated alcohol sulfate surfactants.

BACKGROUND OF THE INVENTION

This invention relates to a process for displacing oil within a subterranean reservoir. More particularly, it relates to improved surfactant materials, compositions, and operating procedures that are useful in waterflood oil recovery processes, especially in reservoirs having relatively high temperatures. The surfactant materials provided by this invention are generally useful wherever a surfactant material is useful.

In a waterflood oil recovery process, an aqueous liquid which is preceded by liquid containing an active surfactant system is injected into the reservoir to displace oil toward a location from which the oil is recovered. In order to increase the efficiency of the oil displacement, the frontal portion of the injected aqueous liquid is arranged to contain or to be preceded by an "active" surfactant system. An active surfactant system is one which has an interfacial tension against oil that is at least as low as $10^{-2}$ dyne per centimeter and is preferably as low as $10^{-4}$ dyne per centimeter. In such a system the surface active components may be dissolved or dispersed in aqueous liquid, oil, or a two-phase liquid system in which the continuous (or external) phase is either water or oil. In general, the oil displacing efficiency of an active surfactant system is such that the injection of one pore volume is sufficient to displace at least about 90 percent of the residual oil from a permeable earth formation material in which the oil displacement efficiency is not limited by the extent of adsorption of the surfactant.

In a waterflood oil recovery process, the efficiency of the oil displacement is strongly affected by the activity (extent of lowering of the oil/water interfacial tension) of the surfactant system. In such a process, the concentration of surface active material in the surfactant system is generally kept low, usually not much more than about 10 percent by weight, in order to minimize the cost of the system. Because of this, it is important that the surfactant system be one from which there is relatively little loss of surfactant during an oil recovery operation. In an oil recovery operation, the surfactants tend to be lost due to (for example): the precipitation of surfactants as insoluble salts of materials, such as polyvalent metal ions, that may be dissolved in the fluid in the reservoir; the adsorption of surfactant material on the reservoir rocks; and/or chemical conversions of the surfactant materials, such as hydrolysis of a sulfate that is an active component of the surfactant system to an alcohol that is insoluble or inactive in that system, etc.

In relatively shallow reservoirs (e.g., reservoirs at depths within a few thousand feet below the surface of the earth), the reservoir temperatures are generally less than about 150° F. In such reservoirs, the surfactant systems of the above-identified copending patent application are particularly advantageous with respect to having a relatively low cost and providing a high degree of activity and relatively low rate of surfactant loss due to precipitation, adsorption and/or hydrolysis. A typical surfactant system of that type comprises an aqueous saline solution containing a mixture of at least one petroleum sulfonate surfactant and at least one alkoxylated alcohol sulfate surfactant. When the sulfate components of such a system are hydrolyzed, they tend to be converted to alcohols that are much less soluble and active as surfactants. In an active surfactant system, the hydrolysis of such a sulfate surfactant usually causes it to become ineffective in respect to being a contributor to the oil displacing efficiency of the system.

The tendency for a sulfate surfactant to undergo hydrolytic decomposition is strongly affected by an increase in temperature. For example, the sodium sulfates of ethoxylated, linear, primary aliphatic alcohols containing from about 12 to 15 carbon atoms and about three ethylene oxide groups per molecule are very effective surfactants in aqueous saline surfactant systems. Although these sulfates exhibit a half-life in the order or about 4,000 days at temperatures near 150° F., their half-life diminishes to a mere 200 days at a temperature near 190° F. The duration of a waterflood oil recovery operation often extendS throughout several years.

SUMMARY OF THE INVENTION

The present invention is, at least in part, premised on a discovery that certain branched-chain alkoxylated alcohol sulfate surfactants have the capability of being mixed with petroleum sulfonate surfactants and aqueous liquid to form surfactant systems having the properties of high activity and low loss due to surfactant precipitation or adsorption that are characteristic of such mixtures of other types of sulfate surfactants. In such mixtures, the unique, sterically hindered, branched-chain, alcohol sulfate surfactants of the present invention exhibit an improved resistance toward hydrolytic decomposition at temperatures above about 150° F. They also exhibit the high activity and low loss that are typical of the previously used types of alcohol sulfate surfactants. The branched-chain alcohol and alcohol sulfate surfactants provided by the present invention are those containing at least one chain-branching substituent (a monovalent hydrocarbon radical) on a carbon atom which is not more than one atom removed from the atom to which the hydroxyl or sulfate group is attached (i.e., on an alpha or beta carbon atom of the alcohol or alcohol sulfate).

With respect to process in which an active, anionic surfactant system is injected into a subterranean reservoir having a temperature exceeding about 150° F., the present invention provides an improvement that comprises injecting an active surfactant system containing at least one anionic surfactant mixed with at least one branched-chain alkoxylated alcohol sulfate surfactant that contains at least one chain-branching substituent on a carbon atom that is not more than one atom removed from the one to which the sulfate group is attached. This surfactant system is particularly useful in substantially any process requiring a high degree of surfactant activity in contact with an aqueous liquid at a relatively high temperature.

DESCRIPTION OF THE INVENTION

Nonionic surfactants provided by the present invention comprise alcohols of the formula

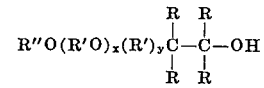

where: $R''$ is a monovalent hydrocarbon radical containing from about eight to 20 carbon atoms; $R'$ is a divalent hydrocarbon radical containing from one to about six carbon atoms; and R is a member of the group consisting of hydrogen atoms and lower alkyl radicals with at least one alkyl radical being present in each compound; $x$ is at least one; and $y$ is zero or an integer.

Anionic, alcohol sulfate surfactants provided by the present invention have the above formula in which the hydroxyl group (—OH) has been replaced by a sulfate group (—$OSO_3$)$^-$. In a preferred procedure for preparing the present sulfate surfactants an alkoxylated alcoholic surfactant of the above formula is sulfated by reacting it with chlorosulfonic acid, sulfur trioxide, sulfonic acid, oleum, sulfuric acid, etc., in the presence or absence of a solvent.

The branched-chain alcoholic nonionic surfactants of the above type can be advantageously prepared by reacting substantially any alcohol of the formula $$R''O(CH_2CH_2O)_xH$$

with an epoxide of the formula

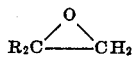

where the symbols have the meaning indicated above. One product of such a reaction is a beta-substituted alcohol of the formula

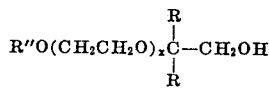

where the symbols have the meanings indicated above.

The beta-substituted nonionic surfactant alcohols and the corresponding anionic surfactant alcohol sulfates are a particularly preferred class of the surfactants provided by this invention.

In general, the surfactants of the present invention can be prepared by alkoxylating and/or sulfonating an alkoxylated alcoholic material that may, in itself, be a relatively active nonionic surfactant. The present surfactants are preferably prepared from the ethoxylated alcohol surfactants. Such ethoxylated alcohol surfactants are further alkoxylated (in order to attach a branched-chain alkoxy alcohol group), for example, by reacting them with an alkylated ethylene oxide. The reaction with the alkylated ethylene oxide produces both a primary alcohol and a secondary or tertiary alcohol. Ethoxylated alcohols which can be further ethoxylated and, if desired, sulfated to form surfactants of the present invention include: ethoxylated straight chain primary alcohols, such as those which are commercially available under the trade name NEODOL, from Shell Chemical Company; ethoxylated aliphatic secondary alcohols, such as those available under the trade name Tergitols, from Union Carbide Company; and ethoxylated alkylphenols, such as those commercially available under the trade name Tritons from the Rohm and Haas Company; etc.

A preferred class of the sterically hindered branched-chain surfactants provided by the present invention comprise the sulfates of alkoxylated alcohols that contain from about eight to 20 carbon atoms and from about two to 10 ethoxy groups. The surfactants of this type, especially those containing two alkyl radicals on the beta carbon atom, exhibit particularly advantageous properties with respect to surfactant activity and lack of adsorption or precipitation in subterranean reservoirs in addition to a particularly low rate of hydrolysis in the presence of an aqueous liquid.

In general, the surfactants provided by this invention can be used for substantially any of the interfacial tension reducing, emulsifying, oil-wetting or the like purposes for which nonionic and/or anionic surfactants are desirable. Since many uses for which anionic surfactants are desirable bring the surfactant material into contact with aqueous fluids in the form of vapors or liquids, the branched-chain sulfates of the present invention are generally advantageous in exhibiting a relatively high degree of thermal stability and a relatively long operating life due to their resistance to hydrolytic decomposition.

In a liquid surfactant system for displacing and/or entraining oil within a subterranean reservoir, the sulfate surfactants of the present invention are preferably mixed with petroleum sulfonates. Such mixtures can be incorporated into surfactant systems in which either a water phase or an oil phase is continuous. Surfactant systems in which a water phase is continuous are generally referred to as aqueous systems, water-external micellar dispersions, etc., and are exemplified by the systems described in patents such as U.S. Pat. Nos. 3,330,344; 3,348,611; and 3,455,386. Surfactant systems in which an oil phase is continuous are commonly referred to as soluble oils, micellar dispersions, micro-emulsions, transparent emulsions, oil-external micellar dispersions, etc., and are exemplified by the systems described in patents such as U.S. Pat. Nos. 2,356,205; 3,254,714; 3,275,075; 3,301,325; and 3,307,628.

Preferred active surfactant systems that contain the surfactants of the present invention are water-phase-continuous systems containing at least one dissolved, water-soluble salt or electrolyte. The electrolyte content of such systems is preferably adjusted to enhance the interfacial tension-lowering activity of the system at the temperature at which the system is to be used. Such a system comprises an aqueous saline solution containing a synergistic mixture of dissimilar anionic surfactants at least one of which is an alkali metal or ammonium or amine salt of an organic sulfonate and at least one of which is an alkali metal or ammonium or amine salt of a branched-chain alkoxylated alcohol sulfate surfactant. The salinity of the solution can be controlled by any suitable means such as by addition of an electrolyte such as Na, K and/or Li chloride, bromide, iodide and mixtures thereof to which can be added optionally a small amount of a polyvalent metal salt such as the corresponding halides of alkaline earth metals, e.g., $CaCl_2$, $BaCl_2$, and the like. Saline solutions containing NaCl and optionally $CaCl_2$ are preferred and such solutions can be dilute, or concentrated solutions and preferably comprise brine solutions containing from about 0.01 to 5 M NaCl and from about 0 to 0.1 M $CaCl_2$. Such saline solutions can advantageously be formulated from saline source waters such as subterranean brines, sea waters, etc. Where the oil-containing earth formation contains a highly saline connate water the electrolyte concentration of the aqueous saline solution of surfactants is preferably near the lower portion of the range of suitable concentration. The total concentration of the anionic surfactant mixture can vary from about 1 percent to about 20 percent by weight of which the sulfonate surfactant can comprise from about 10 percent to 90 percent of the mixture with the balance being the sulfated surfactant. The optimum ratio of the sulfonate to sulfate material depends on the molecular weight of the sulfonate, the presence of polyvalent ion-containing electrolytes and other electrolytes in the formation and other factors. Generally, the higher molecular weight sulfonates are preferably used with large proportions of the sulfate material and the lower molecular weight sulfonates are used with smaller proportions of sulfate material. Also, if a large amount of electrolyte is present in the saline solution, the sulfate material concentration should be increased proportionately.

In general, the branched-chain alkoxylated alcohol sulfate surfactants of this invention can advantageously be mixed with substantially any anionic surfactant in order to provide a mixture exhibiting at least some of the relatively high activity, good tolerance to polyvalent metal ions, and good thermal stability in the presence of aqueous fluid, that is characteristic of the surfactants of this invention. Particularly suitable materials to be incorporated into such systems comprise mixtures of organic sulfonate surfactants that have surfactant-amphiphile properties generated by the oil-solubility versus water-solubility spectrum of certain mixed sulfonates. In such mixtures of sulfonates the oil-soluble (generally higher molecular weight) constituents serve as amphiphiles and are solubilized in an aqueous system by the primarily water-soluble (generally lower molecular weight) sulfonates. Anionic sulfonate surfactants of this type can be illustrated by metal or ammonium salts of sulfonate surfactants, e.g., alkali metal, ammonium or polyvalent metal salts of sulfonated petroleum hydrocarbons such as alkylated naphthalene sulfonates, alkylated benzene sulfonates; or the sulfocarboxylate salts, and the like. Preferred sulfonates are the alkali metal (Na, K, Li) salts of petroleum sulfonates such as $C_{15-30}$ alkyl aryl sulfonates, alkylated benzene sulfonates, and the like. Materials of this type are sold commercially under various trade names, such as petroleum sulfonates sold by Bray Chemical Company or the Bryton Chemical Company as Bryton sulfonate, F, 430, 467, 500, or the Sonneborn Chemical Company as Petronates, or the Socony Mobil Oil Company as "Promor" sulfonates of the SS–6, SS–20 series; American Cyanamid's "Aerosol OT"

which is Na dioctyl sulfosuccinate, and the like. A preferred sulfonate mixture is a sodium salt of a petroleum sulfonate in the molecular weight range of 350–420 and a sodium salt of a petroleum sulfonate in the molecular weight range of 420–580 or a sodium salt of a mixture of petroleum sulfonates having an average molecular weight in the order of about 430–470.

In general, a preferred surfactant system of the present invention comprises a mixture of at least one petroleum sulfonate surfactant and at least one branched-chain alkoxylated alcohol sulfate surfactant dispersed in an aqueous saline solution contained in the order of from about 0.1 to 10 percent by weight of the surfactant material. Such a system may also contain, or be preceded by, or followed by, an aqueous liquid that contains a water-thickening material. Similarly, such a system can advantageously contain additives such as acidic or basic materials for adjusting the pH of the system, corrosion inhibitors, bactericides, fungicides, or the like. The use of a water-thickening material is particularly advantageous with a surfactant in which a water phase is external. Suitable water-thickening materials include starch, carboxymethylated cellulose, various types of polyacrylate and partially hydrolyzed polyacrylamide polymers such as those available under trade names, Pusher, Separan, and the like. Such thickening agents are useful for adjusting the effective mobility of the aqueous liquid injected into a reservoir, relative to the effective mobility of the oil in the reservoir, in order to reduce the tendency of the aqueous liquid to finger through and/or bypass the oil.

One process for the preparation of surfactants of the present invention is exemplified by the following. A commercially available ethoxylated alcohol surfactant, NEODOL 25–5, a mixture of ethoxylated linear primary alcohols containing from 12 to 15 carbon atoms and an average of five ethoxy groups per molecule, was reacted with isobutylene oxide in the presence of a BF$_3$-etherate. The reaction produced a main product consisting of a primary alcohol containing two methyl groups on the beta-carbon atom, i.e., a primary alcohol of the general formula $$CH_3(CH_2)_{12-15} (OCH_2CH_2)_5 OC(CH_3)_2 CH_2OH$$

and a lesser amount of a tertiary alcohol in which the terminal group contains two methyl groups on the alpha-carbon atom and has the formula $$-OCH_2 C(CH_3)_2 OH.$$

The alcohols were sulfated by reacting them with chlorosulfonic acid. The structural formulas of the alcohols and their sulfates were confirmed by means of nuclear magnetic resonance and other structural analytical techniques.

In aqueous surfactant systems that are typified by a mixture of 80 parts of Bryton 430 petroleum sulfonate and 20 parts of the sulfate of the beta-dimethylated primary alcohol of the above formula dispersed in a 0.8 M solution of sodium chloride in water, it was found that indications of oil displacement efficiency and low surfactant loss were typical of such systems in which the sulfate surfactant was a sulfate of the NEODOL 25–5 mixture of anionic alcohols.

What is claimed is:

1. In a process for displacing oil by injecting an active surfactant system into a subterranean reservoir, the improvement which comprises injecting as said system a mixture of at least one anionic surfactant and at least one branched-chain alkoxylated alcohol sulfate surfactant in which said branched-chain alcohol sulfate surfactant contains a chain-branching substituent on a carbon atom not more than one atom removed from the carbon atom attached to the sulfate group.

2. The process of claim 1 in which said subterranean reservoir has a temperature exceeding about 150° F.

3. The process of claim 1 in which said anionic surfactant is a petroleum sulfonate.

4. The process of claim 1 in which said sulfate surfactant is a beta-alkylated alcohol sulfate.

5. The process of claim 1 in which said sulfate surfactant is a beta-dimethylated alcohol sulfate.

* * * * *

PO-1050
(5/69)

UNITED STATES PATENT OFFICE
CERTIFICATE OF CORRECTION

Patent No. 3,675,716            Dated   July 11, 1972

Inventor(s) ROBERT F. FARMER, III; JIMMIE B. LAWSON and WEBSTER M. SAWYER, JR.

It is certified that error appears in the above-identified patent and that said Letters Patent are hereby corrected as shown below:

The designation of inventors should include

WEBSTER M. SAWYER, JR., also of Houston, Texas.

Signed and sealed this 9th day of January 1973.

(SEAL)
Attest:

EDWARD M. FLETCHER, JR.
Attesting Officer

ROBERT GOTTSCHALK
Commissioner of Patents